United States Patent [19]

Endou et al.

[11] Patent Number: 5,707,685
[45] Date of Patent: Jan. 13, 1998

[54] PROCESS FOR FORMING ULTRAFINE PARTICLE FILM, TRANSPARENT PLATE AND IMAGE DISPLAY PLATE

[75] Inventors: Yoshishige Endou, Tsuchiura; Masahiko Ono, Ibaraki-Ken; Masahiro Miyazaki, Mobara; Hiromitsu Kawamura, Mobara; Katsumi Kobara, Mobara; Toshihiro Yamada, Ibaraki-Ken; Toshiaki Kawabata, Tokyo; Takao Kawamura, Chiba, all of Japan

[73] Assignee: Hitachi, Ltd., Tokyo, Japan

[21] Appl. No.: 62,747

[22] Filed: May 18, 1993

Related U.S. Application Data

[63] Continuation-in-part of Ser. No. 855,055, Mar. 19, 1992, abandoned.

[30] Foreign Application Priority Data

Mar. 19, 1991 [JP] Japan ................... 3-054371
May 18, 1992 [JP] Japan ................... 4-124502

[51] Int. Cl.⁶ ................................................ B05D 5/00
[52] U.S. Cl. ................... 427/169; 427/164; 427/419.3; 427/419.1; 427/397.8
[58] Field of Search ........................ 427/164, 165, 427/169, 180, 201, 202, 203, 204, 205, 345, 397.8, 419.3, 419.1

[56] References Cited

U.S. PATENT DOCUMENTS

| | | | |
|---|---|---|---|
| 4,328,267 | 5/1982 | Matsuo et al. | 427/345 |
| 4,556,605 | 12/1985 | Mogami et al. | 428/331 |
| 4,563,612 | 1/1986 | Deal et al. | 313/478 |
| 4,765,729 | 8/1988 | Taniguchi | 351/163 |
| 4,830,879 | 5/1989 | Debsikdar | 427/162 |
| 4,945,282 | 7/1990 | Kawamura et al. | 313/479 |
| 5,049,414 | 9/1991 | Kato | 427/164 |
| 5,291,097 | 3/1994 | Kawamura et al. | 313/478 |

FOREIGN PATENT DOCUMENTS

| | | |
|---|---|---|
| 60-81047 | 5/1985 | Japan . |
| 63-195686 | 8/1988 | Japan . |
| 3-46737 | 2/1991 | Japan . |

OTHER PUBLICATIONS

Physics of thin Films 2, (1964) P242–284, J. Thomas Cox and Georg Hass, "Antireflection Coatings".

Appl. Phys. Lett. 36(9), 727–730, (1980), Chris M. Horwitz, "A new vacuum-etched high transmittance (antireflection) film".

*Primary Examiner*—Marie Yamnitzky
*Attorney, Agent, or Firm*—Antonelli, Terry, Stout, & Kraus, LLP

[57] ABSTRACT

An ultrafine particle film which is effective for the prevention of electrostatic charge and reflection of visible light and can be applied to a large area at low cost, an image display plate such as the one adapted to a Braun tube to which the ultrafine particle film is applied, and a process for producing the ultrafine particle film which comprises attaching a coating solution bath 22 to a surface of a Braun tube 21, filling the bath with a coating solution 23 containing the antistatic $SnO_2$ ultrafine particles so that the surface of the Braun tube 21 is covered with the coating solution, and then exposing the coated Braun tube surface at a predetermined rate to form an electrically conductive film on the Braun tube surface, the above process being repeated by using a coating solution containing the visible light anti-reflection ultrafine particles to form a visible light anti-reflection film on the electrically conductive film.

24 Claims, 8 Drawing Sheets

PROCESS FOR FORMING ULTRAFINE PARTICLE FILM, TRANSPARENT PLATE AND IMAGE DISPLAY PLATE

CROSS-REFERENCE TO RELATED APPLICATION

The application is a continuation-in-part application of Ser. No. 07/855055, filed on Mar. 19, 1992, which was abandoned in favor of Ser No. 08/341,946 (now U.S. Pat. No. 5,612,128).

BACKGROUND OF THE INVENTION

1. Field of the Invention

The present invention relates to a process for forming an ultrafine particle film, especially an ultrafine particle film having both anti-reflection and antistatic functions, a transparent plate and an image display plate formed by applying this technique, and a process for the production thereof.

2. Related Art

Films to reduce the reflectivity (anti-reflection films) capable of reflecting the visible light on a transparent plate surface have been long studied, and have been applied to lenses for cameras and ophthalmic glasses. At present, such films are used as an anti-reflection filter for reducing the reflected light on VDTs (visual display terminal). A variety of anti-reflection films have been proposed, and those mainly used now are multi-layered films and heterogeneous films.

A multi-layered film has a structure in which a material having a low refractive index and a material having a high refractive index are alternately stacked to form at least three layers. Its anti-reflection effect is a synergistic effect produced by the optical interference function of each layer. Multi-layered films are discussed in Physics of Thin Films, 2 (1964), pp. 242–284.

A heterogeneous film having a reflectivity distribution in the film thickness direction is generally formed by rendering a transparent plate surface porous.

Apl. Phys. Lett., 36 (1980), pp. 727–730 discusses a method of reducing the reflectivity in which a heterogeneous film is produced by forming an insular metal deposition film on a glass surface and forming a fine uneven surface by sputter etching.

On the other hand, in a cathode ray tube, it is required not only to form an electrically conductive film for preventing electrostatic charge on glass surface but also to use devices for preventing reflection.

Meanwhile, it is known that the front panel surface (image display plate) of a cathode ray tube such as a Braun tube is electrostatically charged. The reason therefor is as follows. Aluminum is generally deposited to form a thin and uniform film 84 on a phosphor 83 applied to an inner surface 82 of a Braun tube 81 as shown in FIG. 8. In the application of a high voltage to the aluminum film 84, an electrostatic charge occurs on a front panel 85 of the Braun tube due to electrostatic induction when the high voltage is applied and cut off.

JP-A-61-51101 discloses a method of preventing both electrostatic charge and reflection on such a display tube surface. In this method, first an electrically conductive film is formed on a glass substrate by a physical vapor phase method or a chemical vapor phase method such as vacuum deposition and sputtering, and then an anti-reflection film is formed thereon.

The above prior arts involve the problem of high cost as it is required to control the film thickness highly accurately.

Also, the film forming method is limited to a sputtering or vacuum deposition method. Thus, it is substantially impossible to apply these prior art methods to a substrate having a large surface area, due to the restrictions on the apparatus which are inevitable in these methods.

The anti-reflection films formed by the above methods are basically of a structure in which the materials differing in refractive index are deposited in layers on a glass surface, and reflection is prevented by an optical interference function of each layer.

For facilitating understanding of the anti-reflection mechanism, a most simple single-layer deposited film is considered here. When a glass surface having a refractive index of Ng is coated with a material having a lower refractive index than glass, Nf, to a thickness of d, the reflecting behavior of the light incident on this surface can be determined from the Fresnel's formulas, and the reflectivity R is given by the following equation 1:

$$R = \frac{(Nf^2 - Ng)^2}{(Nf^2 + Ng)^2} \quad \text{(Equation 1)}$$

Here, it is assumed that there exists the relation of the following equation 2:

$$Nf \times d = \frac{\lambda}{4} \quad \text{(Equation 2)}$$

where d is layer thickness, and $\lambda$ is light wavelength.

From the above equation, R=0 when $Nf = \sqrt{Ng}$. This signifies a state where there is no reflection of light with a wavelength of $\lambda$. Ng=1.52 for the most common soda glass, so that if it is coated with a material with Nf=1.23, there can be obtained an ideal anti-reflection film at a wavelength $\lambda$ which is decided according to the film thickness d. However, there is yet available no material having such a low refractive index, and among the materials usable at present, magnesium fluoride ($MgF_2$) with Nf=1.38 is the material having the lowest refractive index. In the above case, R=1.3%. Also, anti-reflection conditions for a single-layer film, as apparent from the equations 1 and 2, are set for a specific wavelength $\lambda$, and the reflectivity increases around this specific wavelength $\lambda$. Therefore, in order to reduce the reflectivity in the whole region of visible light (400–700 nm), it was necessary to laminate the materials with different refractive indices to form a multi-layer structure while strictly controlling the film thickness. It is also possible to reduce surface reflection by use of a heterogeneous film having a refractive index distribution in the film thickness direction. In case the glass surface has such an unevenness as illustrated in FIG. 9, the refractive index (nF(x)) can be represented by the equation 3 when the coordinate in the layer depth direction is expressed by x:

$$nF(x) = ng \times V(x) + (1 - V(x)) \times n_0 \quad \text{(Equation 3)}$$

wherein ng is the refractive index of glass, V(x) is the volume occupied by glass at x, and $n_0$ is the refractive index of air.

In this case, the refractive index varies discontinuously at the interface between air and film and at the interface between film and glass substrate as shown in FIG. 10, so that when the refractive indices at these points are taken as $n_1$ and $n_2$, respectively, the reflectivity R of this layer is represented by the equation 4:

$$R = 1 - \frac{4n_0n_1n_2ng}{(n_1ng + n_0n_2)^2 - (n_1^2 - n_0^2)(ng^2 - n_2^2)\sin^2\delta a/2} \quad \text{(Equation 4)}$$

wherein $$\delta a = \frac{2\pi}{\lambda}(n_1 + n_2) \cdot da$$

The reflectivities determined from the above equation at $n_0=1.0$ (refractive index of air), $n_1=1.1$, $n_2=1.47$ and $ng=1.53$ (refractive index of glass) with visible light wavelengths are graphically shown in FIG. 11. It is seen from this graph that the lowest reflectivity can be obtained when the surface unevenness is around 100 nm (0.1 μm). It is, however, difficult to provide an unevenness of such a size regularly on a glass surface, and much time is required for forming such an unevenness even by etching. The present inventors have previously proposed a film having low reflection characteristics comparable with a three-layer deposited film by forming said unevenness with ultrafine particles. In case an uneven film is formed with ultrafine particles, the reflection characteristics are basically represented by the equation 4, but since a thin binder layer 2 is formed between the ultrafine particles and the substrate surface as shown in FIG. 12, it is necessary to distinguish between this thin binder layer 2 and the ultrafine particle layer 1. The ultrafine particle surface layer can be diagrammatically represented by a model shown in FIG. 13. In this case, when ng (refractive index of glass, 1.53) in the equation 4 is substituted by ns (double refractive index of binder and ultrafine particles, 1.47), the following equation 5 is given:

$$Ra = 1 - \frac{4n_0n_1n_2ns}{(n_1ns + n_0n_2)^2 - (n_1^2 - n_0^2)(ns^2 - n_2^2)\sin^2\delta a/2} \quad \text{(Equation 5)}$$

wherein $$\delta a = \frac{2\pi}{\lambda}(n_1 + n_2) \cdot da$$

The reflectivity Rb of the surface layer of glass 3 composed of a binder layer 2 and a mixed layer 15 of air and ultrafine particles can be diagrammatically represented by a model of FIG. 14, and it can be determined from the following equation 6:

$$Rb = 1 - \frac{4n_0n_1n_2ng}{ns^2(n_1 + ng)^2 - (ng^2 - ns^2)(ns^2 - n_2^2)\sin^2\delta b/2} \quad \text{(Equation 6)}$$

wherein $$\delta b = \frac{2\pi}{\lambda}(2ns) \cdot db.$$

Therefore, the overall reflectivity R=Ra+Rb.

Assuming $n_0=1.0$, $n_1=1.10$, $n_2=1.38$ and $ns=1.47$, Ra is about 0.19% at $\lambda=550$ nm. Also, assuming that the transparent plate is glass, $ng=1.53$ and other refractive indices are the same as in the case of Ra, Rb is about 0.04% at $k=550$ nm. Therefore, in this system, R=Ra+Rb≈0.23%.

SUMMARY OF THE INVENTION

The present inventors had found that when the level of a mixed coating solution containing a determined amount of ultrafine particles is elevated up or down on the substrate surface at a constant rate, the ultrafine particles contained in the coating solution are regularly arranged and applied on the substrate surface to give a low reflectivity close to a theoretical value, and this finding was filed for a patent as U.S. Ser. No. 07/855,055 (abandoned in favor of Ser No. 08/341,946; now U.S. Pat. No. 5,612,128) whose content is incorporated herein for reference.

As a result of a further study, it has been found that by first applying the antistatic ultrafine particles and/or the infrared reflecting ultrafine particles on a substrate and then further applying thereon the ultrafine particles for preventing reflection of visible light, there can be obtained the more stabilized characteristics regardless of the substrate material. The present invention was attained on the basis of this finding.

An object of the present invention is to provide a process for forming a visible light anti-reflection film, an antistatic film and/or an infrared-reflection reflection film which can be produced at low cost and can be applied to a large surface area, and an image display plate, window glass for automobiles, protective plate for exhibited articles, etc., which have on their surfaces a film formed according to said process.

The above object can be achieved by first covering a substrate surface with a coating solution in which the ultrafine particles are uniformly dispersed, then exposing the substrate surface and applying the ultrafine particles thereto, this process being repeated at least twice.

Figure 1:
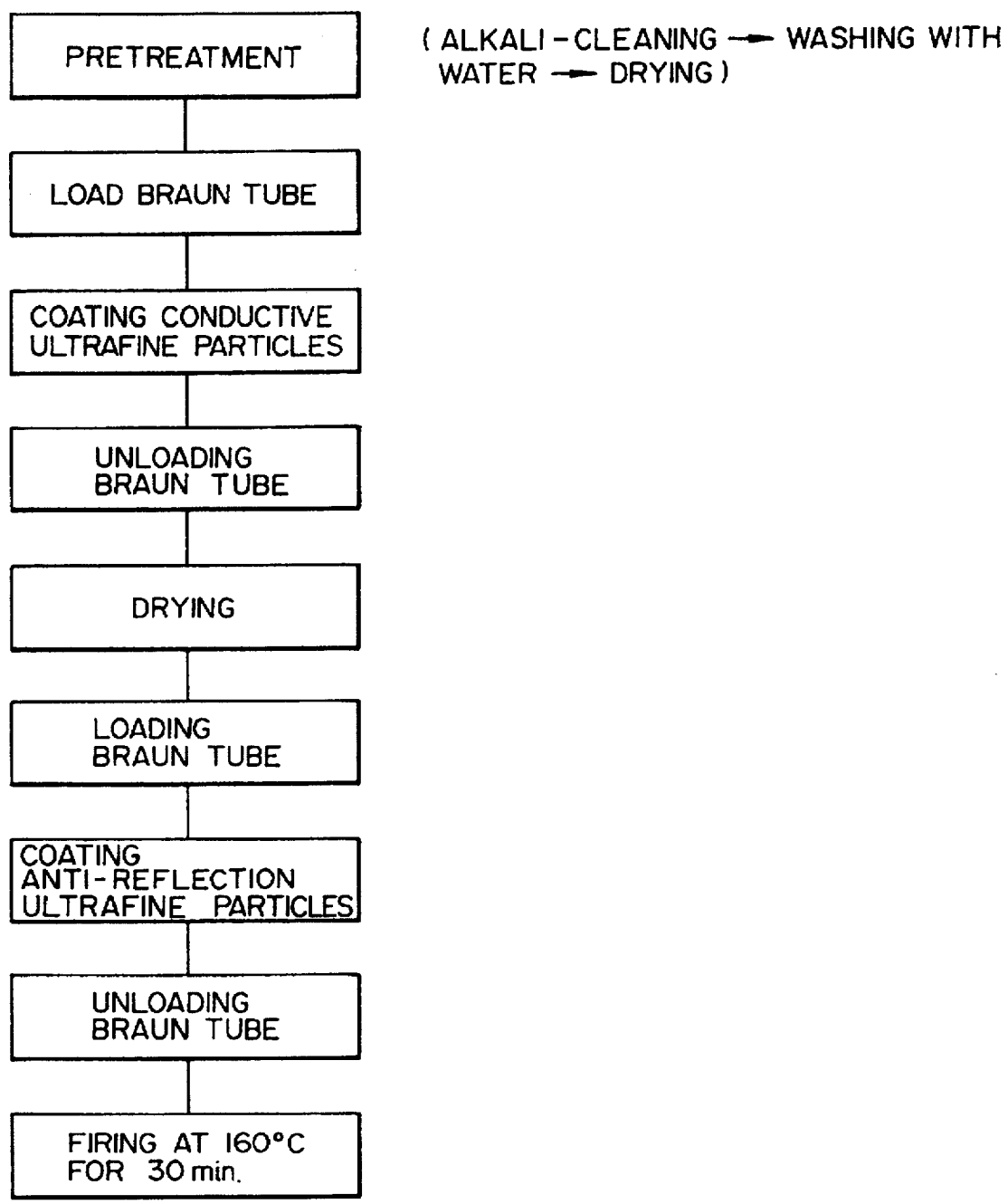
FIG. 1 is a block diagram of a film forming process in an embodiment of the present invention.

Reference numerals in the above Figures designate the following:

1: ultrafine particle film, 2: binder layer, 3: glass plate, 5: conductive film, 10: ultrafine particles, 15: mixed layer of air and ultrafine particles, 21: Braun tube, 22: coating bath, 23: coating solution, 24: pressure-adjusting valve, 25: overflow valve, 26: solution tank, 27: solution-feeding pressure valve, 28: leaking valve, 30: visible light reflection preventive layer, 32: substrate, 34: hard coat, 81: Braun tube, 82: inner surface of Braun tube, 83: phosphor, 84: aluminum film, 85: front panel of Braun tube, 111: automobile, 112: side window, 113: front window, 114: rear window.

DETAILED DESCRIPTION OF PREFERRED EMBODIMENTS

The process for forming an ultrafine particle film according to the present invention is essentially a process in which an ultrafine particle film is formed on a substrate surface by the ultrafine particles and a binder filled in gaps between the ultrafine particles. More specifically, a substrate on which an ultrafine particle film is to be formed is placed in a container, and then a mixed coating solution containing the ultrafine particles and a binder is introduced into the container. After at least the portion of the substrate where an ultrafine particle film is to be formed has been covered with said coating solution, said coating solution is discharged out of the container to expose said portion of the substrate to open air. This operation is repeated at least twice to form two or more layers of ultrafine particle film on the substrate surface.

The ultrafine particles used in the present invention comprise visible light anti-reflection ultrafine particles, antistatic ultrafine particles and/or infrared-reflection ultrafine particles.

For coating on a cathode ray tube or the like, an opening of the size corresponding to the coating area may be provided in a side of the container and the portion to be coated of the tube may be inserted into said opening and subjected to coating.

It is desirable to adjust the coating solution discharge rate so that said portion of the substrate will be exposed at a rate of 10 mm/s or less.

The material for the visible light anti-reflection ultrafine particles is selected from the group consisting of $SiO_2$ (silicon dioxide) and $MgF_2$ (magnesium fluoride). The material for the antistatic ultrafine particles is selected from the group consisting of $SnO_2$ (tin dioxide), $SnO_2+Sb_2O_3$ (antimony oxide), $In_2O_3$ (indium oxide), and $In_2O_3+SnO_2$. The material for the infrared-reflection ultrafine particles is selected from the group consisting of $SnO_2$, $SnO_2+Sb_2O_3$, $In_2O_3$, $In_2O_3+SNO_2$, $TiO_2$ (titanium oxide) and $ZrO_2$ (zirconium oxide).

In the process of this invention, the first-formed ultrafine particle film contains the antistatic ultrafine particles and/or the infrared-reflection ultrafine particles, and the next-formed ultrafine particle film contains the visible light anti-reflection ultrafine particles.

In case the substrate is glass, $Si(OR)_4$ (where R is alkyl) is used as binder. In this case, the substrate may be pretreated with an alkali and/or hydrofluoric acid. In case the substrate is a plastic, $Si(OR)_4$ (where R is alkyl) is used as binder while using a coupling agent having a functional group pertinent to the plastic. It is also desirable to pretreat the substrate with an alkali and/or hydrofluoric acid.

As for the coupling agent, γ-methacryloxypropyltrimethoxysilane is recommended when the plastic is an acryl resin, and γ-glycidoxydpropyltrimethoxysilane is preferred when the plastic is an epoxy resin.

An ultrafine particle film may be formed on both sides or on one side alone of the substrate.

The above anti-reflection ultrafine particles are preferably those having an average particle size (hereinafter simply referred to as particle size) of 80 to 150 nm, and the antistatic ultrafine particles are preferably those composed of a tin oxide compound having a particle size of not greater than 10 nm.

The substrate on which an ultrafine particle film is formed according to the above process is a transparent plate, and this transparent plate can be used as a liquid crystal panel, window glass for automobiles, a protective plate for the exhibits such as pictures, and the like.

We often experience in an art gallery that a work of art, such as a picture, covered by a protective transparent plate (mainly glass or plastic) is hard to see as the transparent plate reflects illumination light or other matter. Various anti-reflection measures are applied for illumination or lighting, but they are ineffective when the work is seen from a certain angle, and in some cases, the work can scarcely be seen. Generally the transparent plates used for protection of the works of art are large in size, and physical difficulties are often encountered for applying a three-layer deposition film which has conventionally been used as an anti-reflection film. Even if an anti-reflection film could be applied to a large-size transparent plate, the apparatus used therefor ought to be large-scaled and hence costly. Use of the process of the present invention, however, enables easy application of a coating film regardless of the size of the object on which the film is to be applied.

An ultrafine particle film may be formed on a transparent substrate by the above method, and such a film-coated transparent substrate may be used as an image display plate or an image display protective plate. Further, such an image display plate or image display protective plate may be applied to a Braun tube.

Said or substrate may not necessarily be a flat one; it may have a curved configuration such as front window of an automobile and lenses.

It is generally known that when a film is formed from a coating solution containing no ultrafine particles by a dipping method, the following equation 7 holds between film thickness t and withdrawal rate v:

$$t=k(\eta v/pg)^{0.5} \qquad \text{(Equation 7)}$$

wherein η is the viscosity of a solution, p is the density of the solution, g is gravitational acceleration, and k is a constant.

On the other hand, the present inventors have found that when the level of a mixed coating solution containing relatively large anti-reflection ultrafine particles (80–150 nm) is elevated up or down on the substrate surface at a constant rate, the arrangement of the ultrafine particles varies greatly depending on the substrate material or the surface condition of the substrate. For instance, when the ultrafine particles are coated on a commercial plate glass, the arrangement of the ultrafine particles varies between the front and rear sides of the plate glass, resulting in different reflection characteristics between them. Analyses of the surface condition of such plate glass by a surface analyzer such as X-ray photoelectric spectrophotometer (XPS) detected a greater amount of $SnO_2$ (tin oxide) from the surface on one side. This is considered attributable to adhesion of tin to glass when the molten glass passes over the tin bath in the plate glass producing process. $SnO_2$ which has adhered to glass can hardly be removed even if the glass is subjected to a pretreatment (glass cleaning). It has been found that when a mixed solution containing the ultrafine particles is coated on a substrate of said surface condition, since its wettability is different from that of the ordinary surface condition, the substrate admits of thinner coating. This means that, as appreciated from Equation 7, it is possible to increase the coating rate for obtaining a same film thickness. An increase of coating rate naturally leads to a reduction of coating time, especially when the substrate to be coated is of a large surface area, and a reduction of manufacturing cost.

As explained above, difference in substrate material causes difference in surface condition, and this results in a change of wettability and a corresponding variation in thickness of the ultrafine particle film. Therefore, in order to obtain a same film thickness and a same arrangement of ultrafine particles, it needs to change the coating conditions for each substrate. Especially in the case of glass and plastic, since they are completely different in surface condition, it is necessary to give careful considerations on setting of the coating conditions including the pretreatment.

According to the process of the present invention, since the small ultrafine fine particles (10 nm or less) of an oxide such as $SnO_2$ or $In_2O_3$ (indium oxide) are applied as the antistatic and/or infrared-reflection ultrafine particles, it is possible to provide a uniform surface condition in the second and succeeding runs of coating even if the substrates to be treated are different in surface condition or composing material. It is thus possible to obtain the same film characteristics under the similar coating conditions. In case of using a mixed coating solution containing the small ultrafine particles of around 10 nm as said antistatic and/or infrared-reflection ultrafine particles, although the arrangement of the particles varies according to the difference in surface condition of the substrate, the particles need not be arranged regularly as in the case of an anti-reflection ultrafine particle film, so that the coated film is not affected by the substrate material and there can be obtained the antistatic and/or infrared-reflection films having the substantially constant characteristics (antistatic and/or infrared-reflection characteristics) by applying a same pretreatment and using the same coating conditions.

EXAMPLES

The present invention will be described with regard to its embodiments by reference to drawings. First, the constituent requirements of the present invention will be explained.
(Ultrafine particles)

The ultrafine particles are not specifically limited in function as far as the transparency and the light transmission properties are not hindered, but refer to those having a submicron average particle diameter. Typical functions thereof are antistatic, anti-reflection and/or infrared-reflection.

The material for the anti-reflection ultrafine particles is preferably selected from the group consisting of $SiO_2$ (silicon dioxide) and $MgF_2$. The material for the antistatic ultrafine particles is preferably selected from the group consisting of $SnO_2$, $SnO_2+Sb_2O_3$ (antimony oxide), $In_2O_3$, and $In_2O_3+SnO_2$. The material for the infrared-reflection ultrafine particles is preferably selected from the group consisting of $In_2O_3$, $In_2O_3+SnO_2$, $TiO_2$ (titanium oxide) and $ZrO_2$ (zirconium oxide).

The above anti-reflection ultrafine particles preferably have an average particle size of 80 to 150 nm. When this average particle size is less than 80 nm, the obtained film may have too flat an outermost surface, and no sufficient anti-reflection effect may be obtained. When it is more than 150 nm, a sufficient anti-reflection effect can be obtained, but diffuse reflection increases. As a result, the film is pacified, and at the same time, the resolution may be decreased. Therefore, the particle size of the anti-reflection ultrafine particles is preferably 80 to 150 nm. All the materials, $SiO_2$, $MgF_2$, etc., for the anti-reflection ultrafine particles have a refractive index of not more than 1.50.

The antistatic ultrafine particles preferably have an average particle size of not more than 10 nm. The ultrafine particles different in kind may be used in combination. When the ultrafine particles having an average particle size of not more than 10 nm are contained in the coating solution, there can be obtained the relatively uniform films even if the substrate varies in surface condition. Also, even if the coating solution is applied thickly, the possibility of causing a reduction of transmittance or clouding of the film is surprisingly small.

Examples of the ultrafine particles having a clear electrically conductive function, an infrared-reflection function or an electromagnetic wave shielding function include metal oxides such as $SnO_2$, $In_2O_3$, $TiO_2$ and $ZrO_2$ and mixtures thereof. Preferred is $SnO_2+10$ wt % $Sb_2O_3$ or $In_2O_3+5$ wt % $SnO_2$, since this combination is excellent in electrically conductive properties and infrared reflection characteristics. The film thickness is preferably 0.1 to 0.5 µm, and the particle size is preferably 5 to 50 nm. The metal oxides having clear electrically conductive properties or mixtures thereof show high light transmittance in the visible light region due to their large energy band gap, which is 3 eV or above. They also show high electrical conductivity as they have a high free electron density owing to the deviation in these metal oxides or mixtures thereof from their stoichiometrical composition and the addition of impurities.
(Light-transmitting substrate)

The light-transmitting substrate may be a glass plate, a plastic plate or a plastic film. Examples of the main component of the plastic plate include polyethylene, polypropylene, urethane, acryl, phenol, epoxy, melamine, polyamide, polyimide, polycarbonate, butyl, epoxyphenol, vinyl chloride and polyester. The surface of the substrate on which an ultrafine particle film is to be formed may not only be planar, but may have a curvature like a Braun tube or front window of an automobile. Further, an ultrafine particle film may be formed on one surface or both surfaces. The surface on which said film is formed can be freely chosen according to the purpose of use and other matters.
(Pretreatment)

When the wettability to a substrate is considered, it is preferred to carry out a preliminary treatment with an alkali or hydrofluoric acid. In the case of a plastic substrate, a pretreatment with a neutral detergent is also effective.
(Precoat)

In the case of a plastic substrate, difficulties are involved in many cases for raising the heating temperature for film formation, so that it is desirable to provide a precoat for strengthening bond between the substrate and the ultrafine particle layer. The material used for the precoat is not specifically limited as far as it is capable of bonding the substrate and the electroconductive (antistatic) and/or infrared-reflecting ultrafine particle film, but an alcohol solution of methacryloxypropyltrimethoxysilane and $Si(OR)_3$ (where R is alkyl) is preferred.

The method for forming such a precoat is not critical. Usually a conventional method is employed. It is of course possible to carry out precoating according to a method in the concept of the present invention.

(Application method)

The exposing rate of a substrate after covered with a coating solution is preferably not more than 10 mm/s. This exposing rate may be kept constant or varied according to the shape of the object to be coated (substrate). The substrate may be rested in a container, or the substrate surface may be exposed through a hole provided in a side of the container. The latter is suitable for forming an ultrafine particle film on nearly completed product such as a Braun tube.

The coating liquid-applied surface is practically fired in a furnace at a temperature in the range of 50° to 200° C. It may be also fired by ultra-violet light from a high-pressure mercury lamp for a short time.

In the case of an electrically conductive and/or infrared reflecting ultrafine particle film, it may be formed by using other coating method such as spin coating or spray coating. However, for forming an anti-reflection film, it is essential to use the film forming method proposed in the-present invention.

(Coating solution)

When the ultrafine particle film of the present invention is formed, there is used a coating solution which contains a predetermined amount of ultrafine particles and a binder, and further contains a coupling agent and other additives as required (U.S. Pat. No. 5,612,128 is referred to for further details on this matter).

When the light-transmitting plate is a glass product, it is preferred to use $Si(OR)_4$ (where R is alkyl) as a binder. When the plate is plastic, it is preferred to use $Si(OR)x$ (where x is 2 to 4, preferably 3) as a binder. Further, when the light-transmitting plate is made of a plastic material, it is preferred to use a coupling agent having a functional group which suits the plastic material.

When the light-transmitting plate is a glass product, the ultrafine particles are dispersed in a solution of $Si(OR)_4$ (where R is alkyl) in an alcohol. When the plate is a plastic, the ultrafine particles are dispersed in a solution of a silane coupling agent having a functional group easily reactive to this polymer of the plastic and $Si(OR)_x$ (where x is 2 to 4, preferably 3) in an alcohol or in a solution of a mixture of the above $Si(OR)_4$ and a silane coupling agent in an alcohol.

The above solution is applied to a light-transmitting plate and the applied surface is heated (or fired) to form a film. Due to this heat treatment, the above $Si(OR)_4$ or the silane coupling agent is decomposed into $SiO_2$, etc., to work as an adhesive between the ultrafine particles and the substrate.

The R in the $Si(OR)_4$ is preferably an alkyl group having 1 to 5 carbon atoms. Meanwhile, the silane coupling agent is required to be suitably selected depending on polymer materials of the light-transmitting plate.

For example, when the light-transmitting plate is formed mainly from polyethylene, polypropylene, urethane or acryl, a silane coupling agent such as vinyltriethoxysilane or γ-methacryloxypropyltrimethoxysilane is effective. When the plate is formed from phenol, epoxy, melamine, polyamide, polyimide or polycarbonate, a silane coupling agent such as γ-aminopropylethoxysilane or γ-glycidoxypropyltrimethoxysilane is effective. Further, when the plate is formed from butyl, epoxy phenol, vinyl chloride or polyester, a silane coupling agent such as β,3, 4-epoxycyclohexylethyltrimethoxysilane or λ-glycidoxypropyltrimethoxysilane is effective.

The alcohol in which the $Si(OR)_4$ or the silane coupling agent is to be dissolved shows an increase in viscosity with an increase in the number of carbon atoms of the above R. In view of operability, therefore, the alcohol can be suitably selected so as not to increase the viscosity to excess. The generally usable alcohol is selected from alcohols having 1 to 5 carbon atoms.

Further, to decompose the $Si(OR)_4$, water and a mineral acid such as nitric acid may be added when the coating solution is prepared.

The following is an embodiment of the present invention as it was applied to the front panel (glass face plate) of a Braun tube.

FIG. 1 is a block diagram illustrating the process in this embodiment of the invention.

First, the surface of the Braun tube is alkali-cleaned and washed with pure water, and then a gas, such as nitrogen gas, is blown thereto so that no marks of waterdrops will be left on the surface. Then the Braun tube is attached to a coating device and a coating solution containing the conductive ultrafine particles is applied thereto. The coating device and the coating method are described later. Typical examples of the coating solution composition and the coating conditions applied in this coating operation are shown in Table 1. After coating, the Braun tube is left as it is for a given period of time, then detached from the coating device and dried with nitrogen gas. Drying may also be accomplished by gas drying, cold- or hot-air drying using clean air or furnace drying. After drying, the Braun tube is attached to another coating device of the same specifications as the first used one, and a coating solution containing the anti-reflection ultrafine particles is applied thereto. Typical examples of the coating solution composition and the coating conditions in this coating operation are shown in Table 1.

TABLE 1

| Coating solution composition and coating conditions | | |
|---|---|---|
| | Antistatic solution (1st layer) | Anti-reflection solution (2nd layer) |
| Solvent (Mixed alcohol) | 95 wt % | 92 wt % |
| Binder ($Si(OR)_4$) | 3 wt % | 3 wt % |
| Ultrafine particles | $SnO_2$ (particle size: 6 nm) 2 wt % | $SiO_2$ (particle size: 120 nm) 5 wt % |
| Coating rate | 3.0 mm/s | 2.5 mm/s |

Then the Braun tube is detached from the coating device and the coated surface is fired at 160° C. for 30 minutes in a furnace. Firing may be performed by ultraviolet or infrared heating. As a result of firing, the ultrafine particles fastly adheres to the Braun tube surface. The above process forms an antistatic, anti-reflection film.

Figure 2:
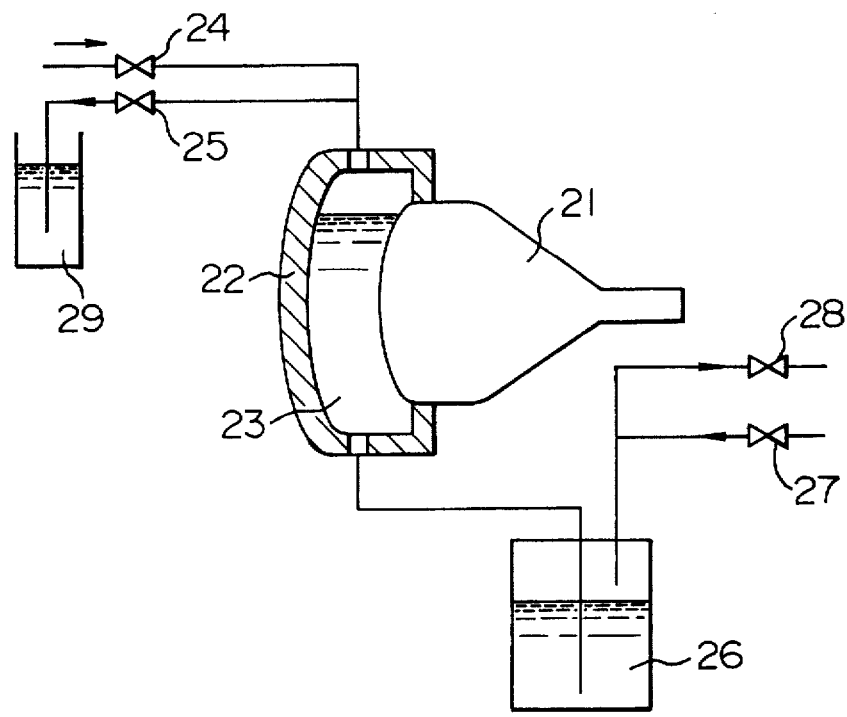
FIG. 2 is a layout drawing of a device of one embodiment of the present invention.

FIG. 2 is a layout drawing of the coating device used in this embodiment of the invention. In FIG. 2, numeral 21 indicates a Braun tube, numeral 22 indicates a coating solution bath, numeral 23 indicates a coating solution, numeral 24 indicates a pressure adjusting valve, numeral 25 indicates an overflowing valve, numeral 26 indicates a solution tank, numeral 27 indicates a solution feed pressure valve, and numeral 28 indicates a leaking valve.

In the above constitution, the Braun tube 21 is attached to the coating solution bath 22 with the surface to be coated facing the inner side of the bath. In this embodiment, the attaching surface of the coating solution bath 22 is provided with a packing or an O-ring shaped sealant to prevent leakage of the coating solution and a pressure gas during the application step. Further, in view of operability, the coating solution bath is also constituted so as to be sealed by merely inserting the Braun tube.

Then, the coating solution containing the ultrafine particles is introduced into a space formed between the coating solution bath 22 and the surface-to-be-coated of the Braun tube. For this introduction, first the pressure adjusting valve 24 and the leaking valve 28 are closed and then the overflowing valve 25 and the solution feed pressure valve 27 are opened.

By the above procedure, the coating solution 23 filled in the solution tank 26 is pressurized to fill it on the Braun tube surface, and part of it is reflowed into an auxiliary tank 29 through the overflowing valve 25, whereby contaminants, etc., adhering to the Braun tube surface or a flow path are discharged together with the overflown solution into the auxiliary tank.

Thereafter, the overflowing valve 25 and the solution feed pressure valve 27 are closed, and the pressure adjusting valve 24 and the leaking valve 28 are opened, whereby the coating solution 23 filled on the Braun tube surface is charged back into the solution tank 26. In this case, due to the gas pressure applied to the pressure adjusting valve 24 and the degree of opening of the leaking valve 28, the lowering rate of the coating solution 23 on the Braun tube surface can be adjusted.

The mixing method for the preparation of the above coating solution will be described below.

For preparing the coating solution for forming an antistatic film applied as the first layer, ethyl silicate [$Si(OC_2H_5)_4$] is dissolved in ethanol, and further, $H_2O$ for hydrolysis and $HNO_3$ as a catalyst are added to form a solution, and the $SnO_2$ ultrafine particles having a particle size of 6 nm are added to the solution in an amount of 2% by weight. For preparing the coating solution for forming an anti-reflection film applied as the second layer, ethyl silicate [$Si(OC_2H_5)_4$] is dissolved in ethanol, and further $H_2O$ for hydrolysis and $HNO_3$ as a catalyst are added to form a solution, and the $SiO_2$ ultrafine particles having a particle size of 120 nm are added to the solution in an amount of 5% by weight. The pH of the solution is adjusted so that the fine particles are well dispersed.

The above coating solution for forming an antistatic film was filled in said space to contact the surface-to-be-coated of the Braun tube, and after said surface has been perfectly covered with the coating solution, the solution level was lowered at a rate of 3.0 mm/s. The coat was force-dried with cold air. On this coat was applied the coating solution for forming an anti-reflection film in the same way. The coating rate in this coating operation was 2.5 mm/s. Thereafter, the coating was fired in air at 160° C. for 30 minutes to decompose the ethyl silicate. The $SnO_2$ ultrafine particles and the $SiO_2$ ultrafine particles added to the respective solutions are firmly bonded and fixed to the Braun tube surface since $SiO_2$ formed by the decomposition works as a binder. The surface of the film forming the first layer has good and uniform wettability as the $SnO_2$ ultrafine particles are uniformly dispersed and coated thereon. Accordingly, the $SiO_2$ ultrafine particles in the second layer are uniformly arranged, allowing formation of a consistent unevenness.

Figure 3:
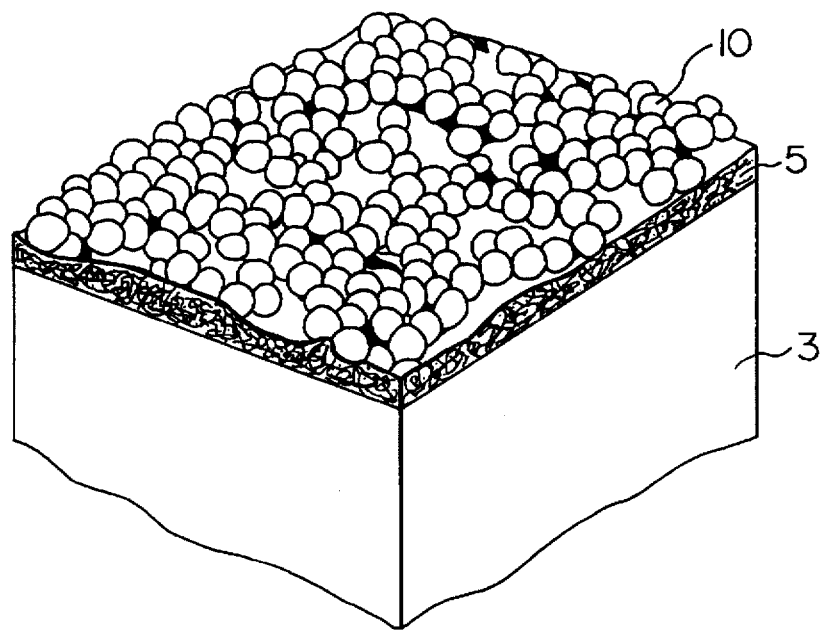
FIG. 3 is a sectional perspective view of one embodiment of the ultrafine particle film of the present invention.

FIG. 3 is a perspective view showing schematically the result of SEM (scanning electron microscope) observation through a cut section of a glass plate made of the same material as Braun tube and coated with the above-described film. In the glass plate 3, the $SiO_2$ ultrafine particles having a particle size of 120 nm are arranged in a layer on an electroconductive film 5 formed with a substantially uniform thickness as the first layer. There are the parts where no ultrafine particles are present, but any of such parts is of an area capable of accommodating only 2 to 3 pieces of ultrafine particle, that is, about 240 to 360 nm in length, which is well smaller than the visible light wavelength, so that no significant effect is given on the reflection characteristics.

Figure 4:
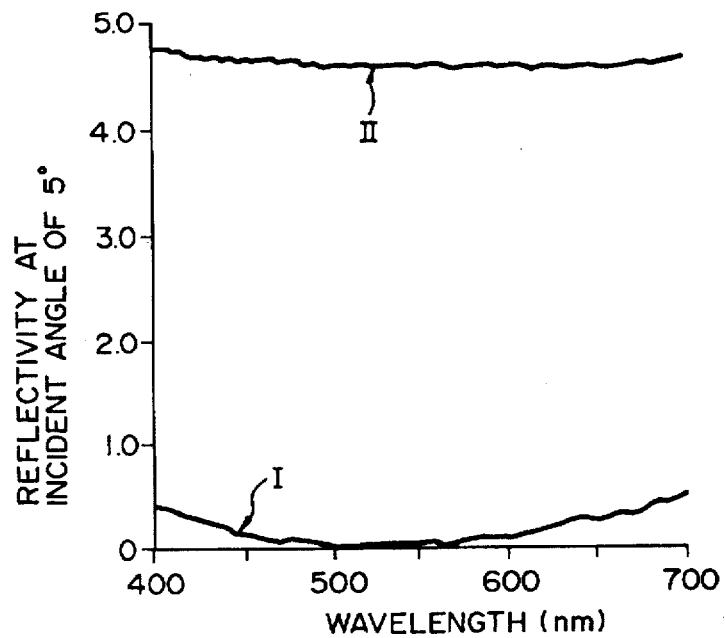
FIG. 4 shows reflection characteristics of an anti-reflection film to which an ultrafine particle film of the present invention has been applied.

The Braun tube surface having the above film formed was measured for a reflectivity of light at an incident angle of 5° to give a low reflectivity of 0.08% at a wavelength of 550 nm as shown by the curve I in FIG. 4-I. The similarly measured reflectivity of a conventional product (the curve II) (with no said film formed) was over 4.5% on the average.

Figure 5:
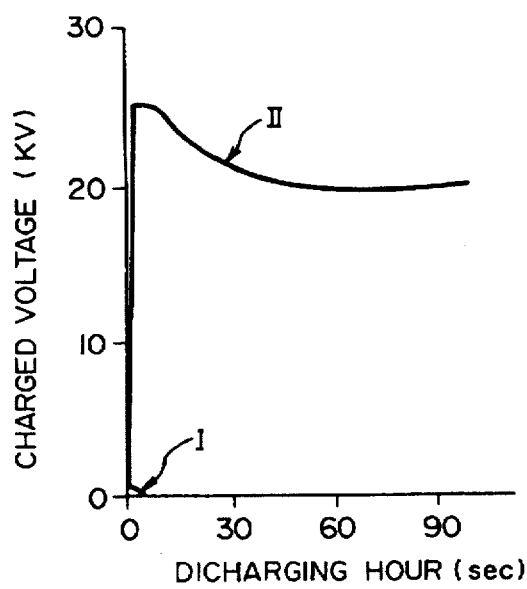
FIG. 5 is antistatic characteristics of an antistatic film to which an ultrafine particle film of this invention has been applied.

On the other hand, the above film was measured for a surface resistance value to show about $10^8$ $\Omega/cm^2$, and the antistatic characteristic of the film was as shown in FIG. 5, which shows that almost no charge appeared on the film according to this invention (indicated by I) as compared with a conventional characteristic (indicated by II) shown as a reference. A thin insulating layer of binder exists between the electroconductive ultrafine particles. It is known that the materials such as $SnO_2$ produce a tunnel effect to cause transfer of electrons, allowing the film to exhibit an electroconductive function.

Then, the antistatic low-reflectivity film of the present invention was rubbed with a rubber eraser (50–30 type, supplied by Lion Corp.) 50 times under a load of 1 kg. The reflectivity changed by about 0.1%, and there was therefore no problem on its quality.

In the above process for forming an antistatic and anti-reflection film, a film can be directly formed on a completed Braun tube, and all the remaining procedures are to mix $SnO_2$ ultrafine particles or $SiO_2$ ultrafine particles in an existing $Si(OR)_4$ alcohol solution, apply it and fire the resultant coating. Thus, the above process gives products having a constant quality at a low cost.

The above embodiment has used $Si(OR)_4$ in which R was ethyl. However, as described earlier, $Si(OR)_4$ wherein R is $C_nH_m$ (m=2n+1) may be used in the range of n=1 to 5. With an increase in n, the viscosity of the solution increases slightly. Therefore, an alcohol compatible with the increase should be selected as a solvent in view of operability.

According to this embodiment, a film having excellent anti-reflection effect and antistatic function can be formed on an image display plate by a simple apparatus and a simple coating operation. Further, the display plate of the present invention can be produced by a simple and safe process, and is suitable for mass-production and also excellent in contamination durability.

Other embodiment will be described by reference to FIG. 6.

Figure 6:
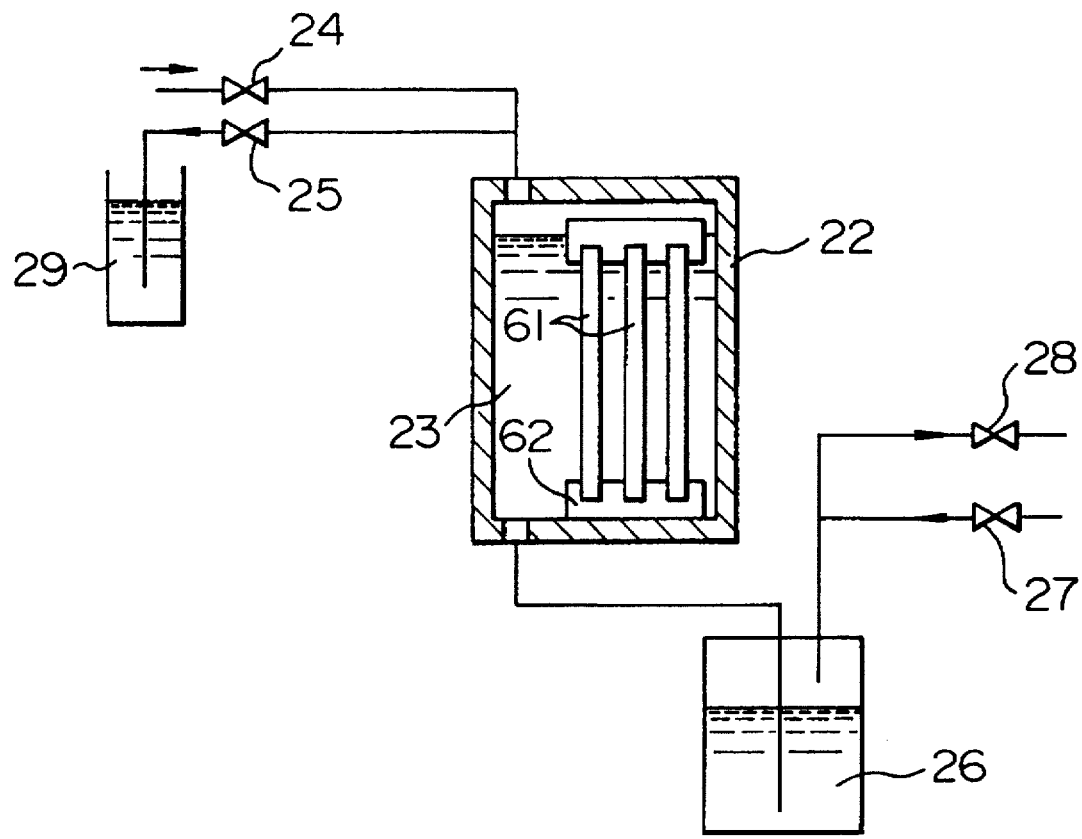
FIG. 6 is a layout drawing of another embodiment of the present invention.

In FIG. 6 the numeral 61 indicates a plurality of transparent substrates which are rested on a tool 62 and encased in a coating solution bath 22. The transparent substrates of the Braun tube of the above first embodiment has been a glass plate, while the clear transparent 61 is a plastic plate.

In this embodiment, the opening formed in the coating solution bath 22 for attachment and detachment of the tool and the object to be coated was provided with a packing or an O-ring shaped sealant to prevent leakage of the coating solution and a pressure gas during the application step and to keep the inside of the coating solution bath 22 in a hermetically closed state.

Then, the coating solution containing the ultrafine particles was introduced into the coating solution bath 22. For this introduction, a pressure adjusting valve 14 and a leaking valve 28 were closed, and an overflowing valve 25 and a solution feed pressure valve 27 were opened. By the above procedure, a coating solution 23 filled in a solution tank 26 was pressurized to fill it in the coating solution bath 22, and part of it was reflowed into an auxiliary tank 29 through the overflowing valve 25.

Then, the overflowing valve 25 and the solution feed pressure valve 27 were closed, and a pressure adjusting valve 24 and a leaking valve 28 were opened, whereby the pressure of the pressurized gas supplied through the pressure adjusting valve 24 is applied to the coating solution 23 filled in the coating solution bath 22, forcing the coating solution 23 return into the solution tank 26. In this case, due to the gas pressure applied to the pressure adjusting valve 24 and the degree of opening of the leaking valve 28, the lowering rate of the coating solution 23 on a plurality of substrates can be adjusted. In this embodiment, the coating steps are substantially the same as illustrated in FIG. 1, but the step of attaching the Braun tube is replaced by a step of setting the tool 62 in the coating solution bath 22, and the step of detaching the Braun tube is replaced by a step of lifting up the tool 62 from the coating solution bath 22 and setting it in another coating apparatus. For three-layer coating, the above operation is carried out by using three different types of coating solution and three sets of coating apparatus of the same specifications.

The method of returning the coating solution 23 filled in the coating solution bath 22 back into the solution tank 26 is not limited to the above-described method utilizing pressurized gas; such return of the coating solution can also be effected by evacuating the solution tank 26.

The mixing method for the preparation of the above coating solution will be described below.

First, a coating operation is carried out for forming a precoat which constitutes the first layer. The coating solution for forming the precoat is prepared by dissolving ethyl silicate [$Si(OC_2H_5)_3$] containing γ-methacryloxypropyltrimethoxysilane in ethanol and further adding thereto $H_2O$ for hydrolysis and $HNO_3$ as a catalyst. For the preparation of the coating solution for forming an antistatic film which constitutes the second layer, ethyl silicate [$Si(OC_2H_5)_3$] containing γ-methacryloxypropyltrimethoxysilane is dissolved in ethanol, followed by addition of $H_2O$ for hydrolysis and $HNO_3$ as a catalyst, so far the same as the preparation of the precoat-forming coating solution, then the $SnO_2$ ultrafine particles having a particle size of 6 nm are added to the solution in an amount of 2% by weight. For preparing the coating solution for forming an anti-reflection layer (third layer), ethyl silicate [$Si(OC_2H_5)_4$] is dissolved in ethanol, followed by, addition of $H_2O$ for hydrolysis and $HNO_3$ as a catalyst to form a solution, and the $SiO_2$ ultrafine particles having an average particle size of 80 nm are added to the solution in an amount of 5% by weight. The pH of the solution is properly adjusted so that the particles will be well dispersed.

Coating was carried out successively with these three types of coating solution according to the above-described procedure by using the apparatus shown in FIG. 6. The coating conditions in the above coating operations are shown in Table 2.

TABLE 2

Coating solution compositions and coating conditions

| | Precoating solution (1st layer) | Antistatic solution (2nd layer) | Anti-reflection solution (3rd layer) |
|---|---|---|---|
| Solvent (Mixed alcohol) | 97 wt % | 95 wt % | 92 wt % |
| Binder | [$Si(OR)_3$] + γ-methacryloxy-propyltrimethoxy-silane 3 wt % | [$Si(OR)_4$] 3 wt % | [$Si(OR)_4$] 3 wt % |
| Ultrafine particles | — | $SiO_2$ (particle size: 6 nm) 2 wt % | $SiO_2$ (particle size: 80 nm) 5 wt % |
| Coating rate | 4.0 mm/s | 3.0 mm/s | 2.5 mm/s |

Figure 7:
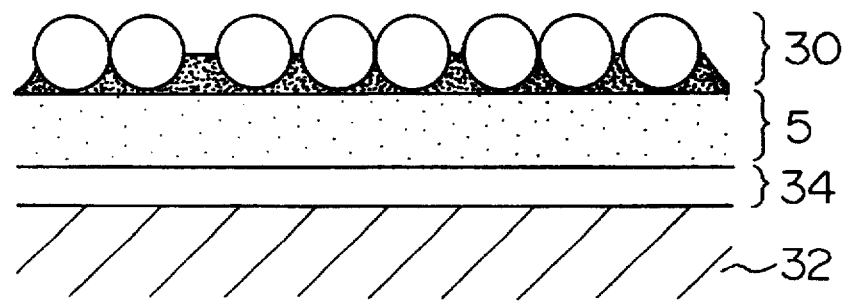
FIG. 7 is a schematic cross-sectional view of an ultrafine particle film in another embodiment of the present invention.
Figure 8:
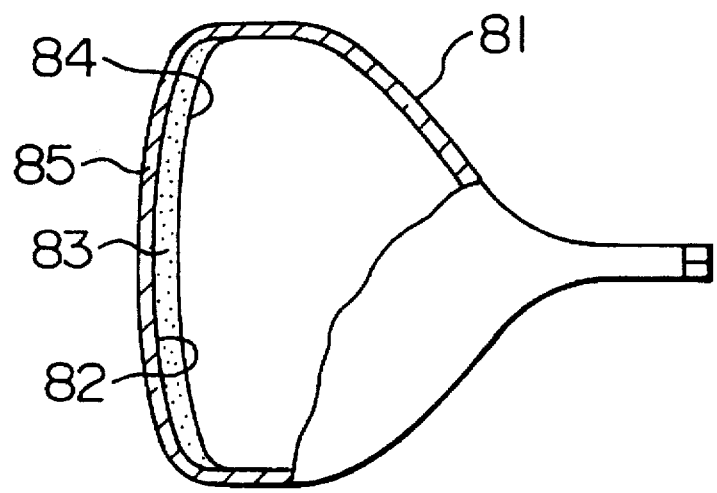
FIG. 8 is a cross-sectional view of a cathode ray tube as one embodiment to which the present invention has been applied.
Figure 9:
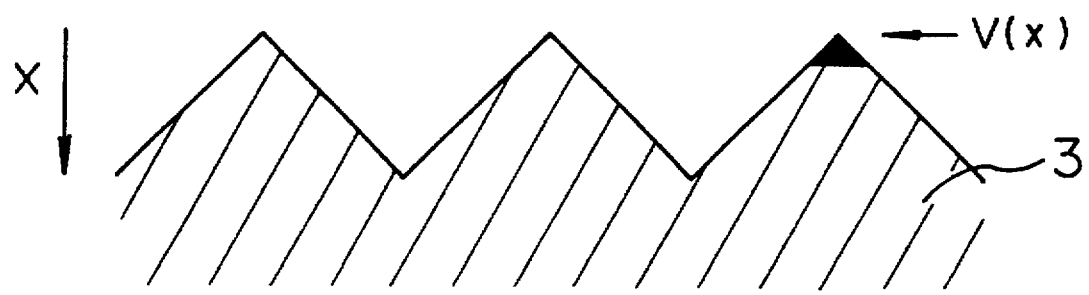
FIG. 9 is a diagrammatic illustration of the anti-reflection principle of the present invention.
Figure 10:
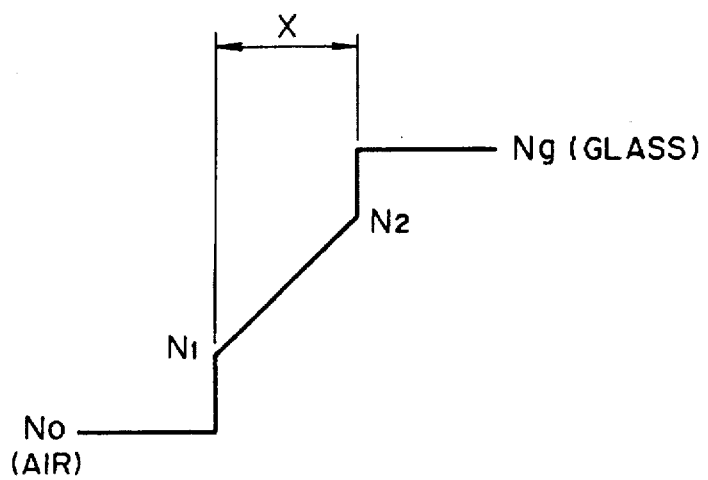
FIG. 10 is a schematic illustration of the anti-reflection principle of the present invention.
Figure 11:
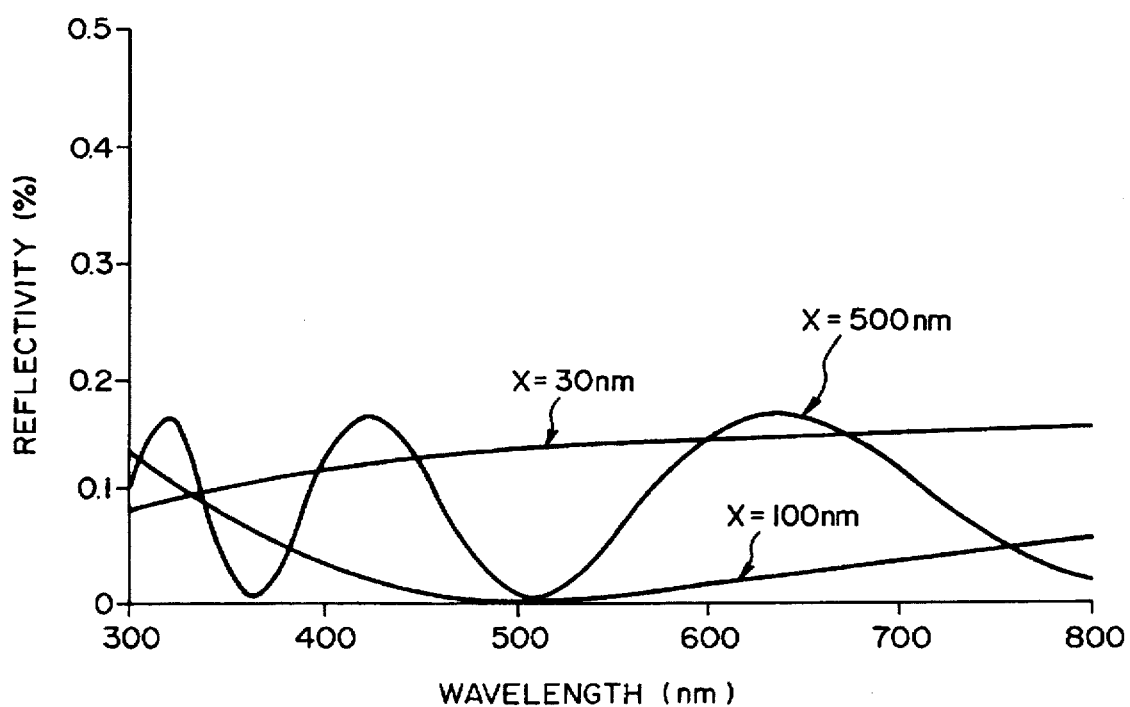
FIG. 11 shows reflection characteristics illustrating the anti-reflection principle of the present invention.
Figure 12:
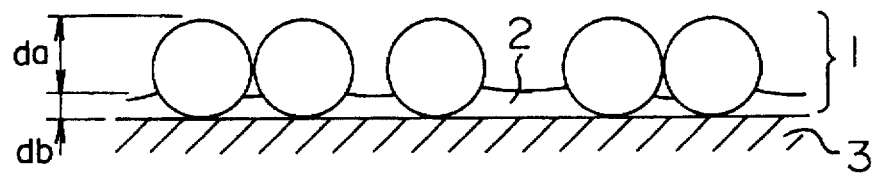
FIG. 12 is an illustration of a reflection characteristics model of the present invention.
Figure 13:
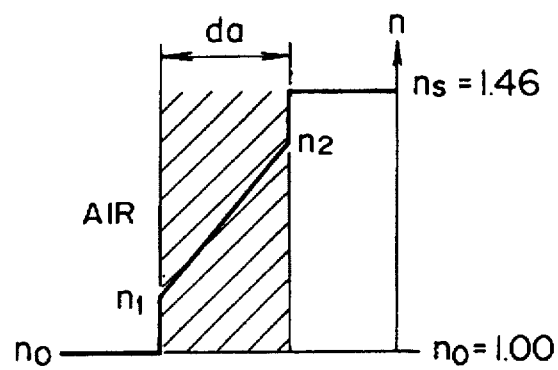
FIG. 13 is an illustration of another reflection characteristics model of the present invention.
Figure 14:
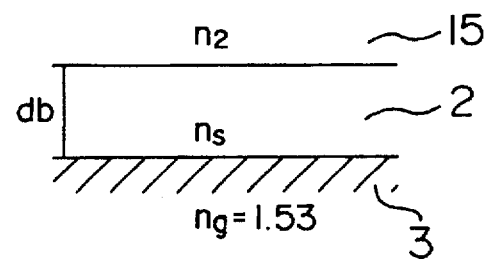
FIG. 14 is an illustration of still another reflection characteristics model of the present invention.

After completion of the three sequential runs of coating operation, the coating was fired at 50° to 120° C. depending on the type of the plastic material used. FIG. 7 is a schematic sectional view of the above-formed coating film on a substrate 32 as it was observed through SEM. On the surface of the substrate 32 is formed a precoat layer 34 (first layer), and formed thereon is an antistatic electroconductive film 5, both being substantially uniform in thickness. The $SiO_2$ ultrafine particles in the third layer forming a visible light anti-reflection layer 30 were arranged substantially uniformly as in the case of the above-described glass substrate. The anti-reflection function of this coating film was also the same as in the case of the glass substrate. Further, this film was excellent in antistatic function, abrasion resistance and durability.

When a transparent substrate having the above film formed thereon was used as a protective plate for an exhibit, the plate was scarcely prone to reflection and also proof against scratches, confirming usefulness of the coated plate of this invention as a protective plate.

In the above embodiment, an ultrafine particle film having a three-layer structure has been formed. It is possible to form an ultrafine particle film having a greater number of layers by additionally conducting the above-described process as many times as required.

Figure 15:
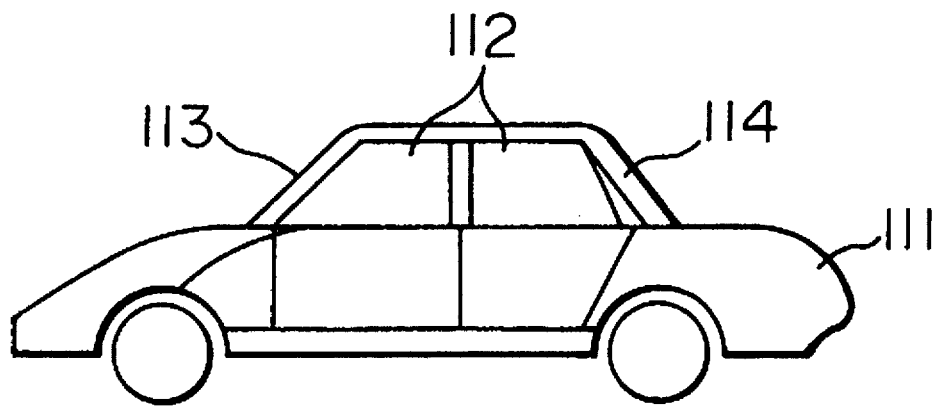
FIG. 15 is a schematic drawing of an automobile in which an anti-reflection transparent plate according to the present invention is applied to as window glass.

An embodiment of ultrafine particle film of this invention as applied to window glass of an automobile will be described below by reference to FIG. 15.

Window glass for automobiles reflects light such as sunlight, so that when one is driving after another car or when there is a car running toward you on the opposite lane, one might be dazzled by the light reflected from the front window 113 or the rear window 114 of such a car and feel a danger. Also, sunlight enters the car through the window and the interior of the car is heated by infrared rays, so that it is required that the car interior cooling capacity be increased in summer.

When an ultrafine particle film of this invention is applied to window glass of a car, reflection of visible light is prevented by the visible light anti-reflection layer (surface layer) of the film, while infrared rays are reflected by the infrared ray reflecting layer on the glass surface.

Thus, the ultrafine particle film of this invention, when applied to a car window glass, helps to increase the anti-dazzle effect of the car window to elevate safety in driving and also contributes to reducing the consumption of energy required for air-conditioning of the interior of the car.

According to the present invention, as described above, it is possible to easily form a visible light anti-reflection film, an antistatic film and/or an infrared-reflection film as a laminate on an object such as window glass by a simple coating method using the ultrafine particles.

What is claimed is:

1. A process for forming films on a surface of a substrate, comprising the steps of:
    introducing a first coating solution containing antistatic ultrafine particles having an average particle size of 10 nm or less and a binder into a container in which is provided at least the surface of the substrate until said surface is covered with said first coating solution;
    subsequently discharging said first coating solution from said container to coat said surface with said first coating solution, thereby forming a first film containing antistatic ultrafine particles on said surface;
    subsequently introducing a second coating solution containing anti-reflection ultrafine particles having an average particle size of 80 to 150 nm and a binder into said container until said surface having said first film provided thereon is covered with said second coating solution; and
    subsequently discharging said second coating solution from said container to coat said surface having said first film provided thereon with said second coating solution, thereby forming a second film containing anti-reflection ultrafine particles on said first film,
    wherein the second coating solution is discharged at a rate sufficient to provide said second film in which said anti-reflection ultrafine particles are regularly arranged in a single layer in such a manner that any area not having said anti-reflection ultrafine particles present has a length less than visible light wavelength.

2. A process according to claim 1, wherein the anti-reflection ultrafine particles are selected from the group consisting of $SiO_2$ (silicon dioxide) and $MgF_2$ (magnesium fluoride).

3. A process according to claim 1, wherein the antistatic ultrafine particles are selected from the group consisting of $SnO_2$ (tin dioxide), $SnO_2+Sb_2O_3$ (antimony oxide), $In_2O_3$ (indium oxide), and $In_2O_3+SnO_2$.

4. A process according to claim 1, wherein the substrate is glass, the binder of the first and second coating solutions is $Si(OR)_4$ (wherein R is alkyl), and the substrate is pretreated with an alkali and/or hydrofluoric acid.

5. A process according to claim 1, wherein the substrate is a plastic, the binder of the first and second coating solutions is $Si(OR)_3$ (wherein R is alkyl), a coupling agent having a functional group capable of bonding with said plastic is used, and the substrate is pretreated with at least one selected from the group consisting of alkali and hydrofluoric acid.

6. A process according to claim 5, wherein the plastic is acryl resin, and the coupling agent is γ-methacryloxypropyltrimethoxysilane.

7. A process according to claim 5, wherein the plastic is epoxy resin and the coupling agent is γ-glycidoxypropyltrimethoxysilane.

8. A process according to claim 1, wherein said first and second films are formed on both sides of the substrate.

9. A process according to claim 1, wherein said first and second films are formed only on one side of the substrate.

10. A process according to claim 1, wherein the anti-reflection ultrafine particles are $SiO_2$ ultrafine particles having a particle size of 80 to 150 nm.

11. A process according to claim 1, wherein the antistatic ultrafine particles comprise tin oxide.

12. A process according to claim 1, wherein said substrate is a transparent substrate.

13. A process according to claim 12, wherein the substrate is glass, the binder of the first and second coating solutions is $Si(OR)_4$ (wherein R is alkyl), and the substrate is pretreated with an alkali and/or hydrofluoric acid.

14. A process according to claim 12, wherein the substrate is a plastic, the binder of the first and second coating solutions is $Si(OR)_3$ (wherein R is alkyl), a coupling agent having a functional group capable of bonding with said plastic is used, and the substrate is pretreated with at least one selected from the group consisting of alkali and hydrofluoric acid.

15. A process according to claim 14, wherein the plastic is acryl resin, and the coupling agent is γ-methacryloxypropyltrimethoxysilane.

16. A process according to claim 14, wherein the plastic is epoxy resin, and the coupling agent is γ-glycidoxypropyltrimethoxysilane.

17. A process according to claim 12, wherein the anti-reflection ultrafine particles are selected from the group consisting of $SiO_2$ and $MgF_2$.

18. A process according to claim 12, wherein the anti-reflection ultrafine particles are $SiO_2$ ultrafine particles.

19. A process according to claim 12, wherein the surface of the substrate is provided in said container such that said surface extends in a substantially vertical direction.

20. A process according to claim 1, wherein said first coating solution further contains infrared reflection ultrafine particles having an average particle size of 5 to 50 nm.

21. A process according to claim 1, wherein the infrared reflection ultrafine particles are selected from the group consisting of $SnO_2$, $SnO_2+Sb_2O_3$, $In_2O_3$, $In_2O_3+SnO_2$, $TiO_2$ (titanium oxide), and $ZrO_2$ (zirconium oxide).

22. A process according to claim 1, wherein the surface of the substrate is provided in said container such that said surface extends in a substantially vertical direction.

23. A process according to claim 1, further comprising firing the first and second films.

24. A process according to claim 1, wherein said substrate is a Braun tube.

* * * * *